Nov. 3, 1964          L. JURGEN-LOHMANN ETAL          3,155,697
       CONTINUOUS COUNTERCURRENT PROCESS FOR THE TRANSITION OF
              SUBSTANCES BETWEEN A LIQUID AND A SOLID PHASE
                     Original Filed June 24, 1957
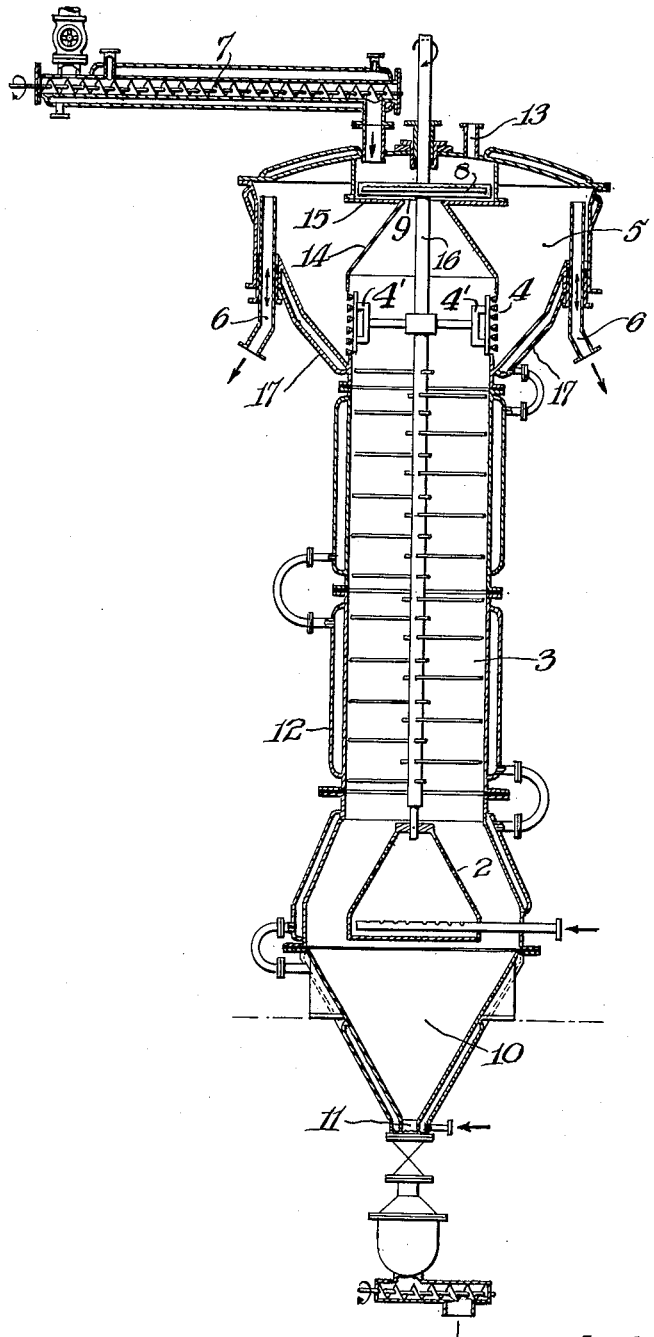
INVENTORS
Ludwig Jurgen-Lohmann
and Josef Kaupp
BY Connolly and Hutz
ATTORNEYS ced Nov. 3, 1964

3,155,697
CONTINUOUS COUNTERCURRENT PROCESS FOR THE TRANSITION OF SUBSTANCES BETWEEN A LIQUID AND A SOLID PHASE
Ludwig Jurgen-Lohmann, Augsburg, and Josef Kaupp, Gersthofen, near Augsburg, Germany, assignors to Farbwerke Hoechst Aktiengesellschaft vormals Meister Lucius and Brüning, Frankfurt am Main, Germany, a corporation of Germany
Original application June 24, 1957, Ser. No. 667,623. Divided and this application Sept. 20, 1960, Ser. No. 59,139
Claims priority, application Germany, June 23, 1956, F 20,606
3 Claims. (Cl. 260—412.8)

The present invention relates to a continuous countercurrent process for the transition of substances between a liquid and a solid phase and is a divisional application of U.S. application Serial No. 667,623, filed June 24, 1957 and now abandoned.

Several processes are known for the transition of substances between a solid and a liquid phase in a tower through which both phases pass continuously in countercurrent paths of travel. These processes are intended for the treatment of relatively coarse materials. Dust portions naturally contained in the solid phase or formed in the course of comminution are either removed by sieving or dust-like material is discharged together with the liquid phase. An exception to the above is German Patent 532,187. According to this patent, oil-containing flours are extracted in countercurrent flow in a tower. Said process suffers, however, from the considerable disadvantage that the velocity of flow of the extracting agent must be increased in order to prolong the time of extraction, i.e. the time for which the material to be extracted stays in the extraction zone. This is due to the fact that in this process the solid particle passes through the extraction zone in free fall. The sedimentation speed of the solid particle can only be decreased by increasing the speed of the countercurrent. Such an increase means an increase in the ratio of throughput of extracting agent to throughput of material to be extracted and thus renders the process less economical. Furthermore, it has not hitherto been taken into consideration that, in the case of many materials, a large number of gas bubbles are formed, especially at raised temperatures, which causes considerable disturbance.

Now, we have found a continuous countercurrent process for the transition of substances between a solid and a liquid phase in a tower, in which process the solid phase is present in the form of dust or contains dust portions. The process of the invention enables any desired periods of time for the transition of substances depending on the conditions of each particular case to be adjusted independently of the velocity of flow of the liquid phase. According to this invention, the velocity of flow of the liquid phase is chosen in such a manner that a level velocity distribution which is in vertical position to the direction of flow is obtained in the zone of transition of substance and the solid phase is removed in such a manner that the speed of the solid particles diminishes in the direction of the axis of the tower throughout the entire transition zone. Thus, no free sedimentation but only a hindered sedimentation is produced in the zone of transition of substance, and the liquid phase is conducted so that in every horizontal plane of the zone of transition of substance equal density is obtained in all places.

The above mode of operation is primarily ensured by introducing the liquid phase over the entire cross-section of the tower. The process of the invention offers the advantage over the known processes that in the case of dusty material a sedimentation equilibrium can be obtained in the zone of transition of substance.

Especially advantageous features of executing the process of the invention are as follows:

Before entering the zone of transition of substance, the solid phase may be mashed in the tower with small amounts of liquid phase.

If formation of gas bubbles takes place, a calming zone is arranged in series with the zone of transition of substance and the liquid phase is freed from gas bubbles before entering said calming zone.

The process of the invention is advantageously carried out in an apparatus comprising a vertically arranged tower with a feed device for the dusty material, a conical shaped outlet for the sludge and, if desired, a heating jacket, a slowly rotating stirrer and a sieve, arranged in the casing of the tower, for the discharge of the liquid. The distributor for the liquid is constructed as a conical shaped sieve and the casing of the tower is conically enlarged at this place in such a manner that the ring-shaped area thus formed corresponds to the cross-section of the tower. At the inlet for the dusty material, the tower is constructed in the form of a cone. Within the range of the sieve, a cone widening towards the outside is provided for the discharge of the liquid.

One apparatus suitable for use in carrying out the process of the invention is illustrated diagrammatically in the accompanying drawing.

The drawing represents an apparatus for the extraction of a material evolving gas bubbles during the extraction.

Referring to the drawing, the solvent is pumped in at 1 and uniformly distributed over the cross-section of the tower by the cone-shaped sieve aggregate distributor 2. The solvent rises in the tower, proceeds through sieve curtain 4 to the calming zone 5 and leaves as extract solution through overflow nozzles 6 the height of which can be adjusted. By means of a dosing worm 7, or other type of dosing device, and a bucket wheel feeding device 8, the material to be extracted which has been comminuted and heated to extraction temperature, is introduced at 9 in an adjustable and continuous manner in countercurrent to the solvent. By gravitation, the material falls through the extraction tower 3, passes around the sieve aggregate distributor 2 which is arranged in such a manner that no decrease in cross-section takes place with respect to the cross-section of the tower, and is removed at 11 in a continuous and adjustable manner by means of a dosing worm 7' or another discharge member. Before being introduced into the extraction apparatus, the solvent and the material to be extracted are heated to extraction temperature. During their residence time in the tower they are maintained at constant extraction temperature by jacket heater 12.

The constant feed velocity and the constant discharge velocity are adjusted in such a manner that a sludge column is obtained in the tower the density of which column increases in the direction of the movement of the solid particles. In this particular case, the upper boundary surface of the column is kept at the beginning of the conical extension 17 of the casing (in cases in which no gases are expected to be evolved from the material to be extracted, the sieve curtain 4 and the pair of brushes 4' are dispensed with and the upper boundary of the sludge column is raised to a height above the lower opening of the conical casing 14). Gas bubbles formed in the course of the extraction move upwards in the tower, glide past sieve curtain 4 and leave through de-aerating nozzle 13. By means of sieve curtain 4, conical casing 14 and bucket wheel casing 15, the gas bubbles are prevented from whirling through the calming zone 5. The latter is connected with the feed zone only in a siphon-like manner by means of the sieve curtain 4 so that currents of liquid forming in the feed zone do not disturb the calming zone. In this manner, the feature is achieved that the extract solution leaving through the overflow nozzles is substantially free from dust. The sieve curtain 4 is brushed by the pair of brushes 4' arranged on the stirring worm 16. The latter rotates at a slow speed in the order of one revolution per minute. In a part of the tower, said stirring worm is provided with thin stirring arms 16' which do not substantially diminish the cross-section of the tower and which prevent the formation of channels in the extraction sludge.

Depending on its wettability, the material to be extracted is introduced into the solvent by means of the above mentioned bucket wheel either in the form of dust or as a mash. When the material is introduced in the form of dust, the level of the liquid in the tower is lowered so as to be immediately below that of the bucket wheel. When the material is introduced in the form of a mash, the level of the liquid in the tower is raised to the level of the bucket wheel.

The above example shows the extraction of a solid substance of greater specific gravity than the extract solution.

The process of the invention can also be used for the extraction of a solid substance of lower specific gravity than the extract solution. In this case the tower is to be arranged in such a manner that the bottom and the top of the tower are interchanged as compared with the above example.

The process of the invention can furthermore be used for the opposite type of transition of substance, i.e. for an adsorption.

The following example serves to illustrate the invention but it is not intended to limit it thereto.

EXAMPLE

Extraction of oil from cocoa powder by means of pure benzene.

The extraction is carried out in the apparatus shown in the drawing, the cylindrical part of the tower having a diameter of 220 cm. and a height of 300 cm.

Method of Proceeding

The process is carried out as described above, without formation of gas bubbles taking place.

Extraction temperature 35° C. Both the cocoa powder and the benzene are heated to 35° C. prior to being introduced.

Charge: 1.3 metric tons per hour of cocoa powder containing 17.6% of oil. 1.86 metric tons per hour of pure benzene.

Discharge: 1.53 metric tons per hour of a mash of cocoa and benzene containing 30% by weight of benzene. 1.63 metric tons per hour of extract containing 14% of oil.

Residence time of the powder in the extraction zone: 4.3 hours.

Ratio of throughput of cocoa powder to throughput of benzene 1:1.4.

The cocoa powder discharged has a residual oil content of less than 0.1%.

During the extraction, the upper boundary surface of the sludge column is kept about 4 cm. above the lower opening of cone 14 by means of an appropriate control member.

Obviously many modifications and variations of the present invention are possible in the light of the above teachings. It is, therefore, to be understood that within the scope of the appended claims the invention may be practiced otherwise than as specifically described.

What is claimed is:

1. A continuous process for effecting a material exchange between a comminuted solid phase containing dust particles and a liquid phase comprising (A) equally distributing the liquid phase over the entire cross-section of an elongated vertical contact zone, the horizontal cross-section of said elongated vertical contact zone being constant over the entire length, (B) contacting the phases in counter-current flow in said contact zone, (C) conducting the liquid phase ascendingly and longitudinally through the contact zone at a velocity which is constant throughout any plane transverse to the direction of movement within the contact zone, said velocity being small enough to allow the dust particles of the solid phase to move by the action of gravity exclusively in opposite direction to the liquid current, (D) maintaining within the contact zone within any given plane transverse to the direction of movement within the contact zone a uniform distribution of liquid and solid phase throughout said given plane, (E) maintaining in the contact zone an increasing concentration of the solid particles in the direction of their movement by withholding the removal of the solid phase from the contact zone at the beginning of the process and, (F) removing each phase from the contact zone.

2. The process of claim 1, wherein the solid phase before entering the contact zone is made into a mash with a small amount of the liquid phase.

3. The process of claim 1, wherein the liquid phase passes through a calming zone arranged in series with the contact zone, and gas bubbles are removed from the liquid phase before it enters the calming zone.

References Cited in the file of this patent

UNITED STATES PATENTS

| | | |
|---|---|---|
| 2,309,139 | Rector | Jan. 26, 1943 |
| 2,520,391 | Findlay | Aug. 29, 1950 |
| 2,813,781 | Mertes | Nov. 19, 1957 |
| 2,828,230 | Heinrich | Mar. 25, 1958 |
| 2,850,438 | Bodkin | Sept. 2, 1958 |
| 2,921,842 | List | Jan. 19, 1960 |
| 2,932,552 | Weiss et al. | Apr. 12, 1960 |
| 2,932,559 | Placek | Apr. 12, 1960 |